US011869681B2

(12) United States Patent
Tanaka

(10) Patent No.: US 11,869,681 B2
(45) Date of Patent: Jan. 9, 2024

(54) MULTICORE CABLE

(71) Applicant: SUMITOMO ELECTRIC INDUSTRIES, LTD., Osaka (JP)

(72) Inventor: Seiji Tanaka, Tochigi (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/812,274

(22) Filed: Jul. 13, 2022

(65) Prior Publication Data

US 2023/0048028 A1 Feb. 16, 2023

(30) Foreign Application Priority Data

Aug. 3, 2021 (JP) ................................ 2021-127269

(51) Int. Cl.

*H01B 11/02* (2006.01)
*H01B 11/18* (2006.01)
*H01B 11/20* (2006.01)

(52) U.S. Cl.

CPC ......... *H01B 11/1895* (2013.01); *H01B 11/02* (2013.01); *H01B 11/20* (2013.01)

(58) Field of Classification Search

CPC . H01B 3/30; H01B 7/14; H01B 7/045; H01B 9/003; H01B 11/02; H01B 11/20; H01B 11/18; H01B 11/1895

USPC ............ 174/102 R, 107, 108, 109 R, 110 R, 174/113 R, 36, 28

See application file for complete search history.

(56) References Cited

U.S. PATENT DOCUMENTS

| | | | | |
|---|---|---|---|---|
| 4,970,352 A * | 11/1990 | Satoh | H01B 11/1808 | 174/102 C |
| 8,957,312 B2 * | 2/2015 | McCullough | H01B 13/00 | 174/126.4 |
| 9,390,842 B2 * | 7/2016 | Hayashishita | H01B 13/34 | |
| 2007/0184689 A1 * | 8/2007 | Tanaka | H01B 7/423 | 439/86 |
| 2007/0187134 A1 * | 8/2007 | Detian | H01B 11/20 | 174/126.1 |
| 2014/0236125 A1 * | 8/2014 | Watanabe | A61M 25/09033 | 604/528 |
| 2015/0096785 A1 * | 4/2015 | Hayashishita | H01B 11/20 | 174/113 R |
| 2022/0254549 A1 * | 8/2022 | Tsukahara | H01B 11/18 | |

FOREIGN PATENT DOCUMENTS

| | | |
|---|---|---|
| JP | 2018-073741 | 5/2018 |

* cited by examiner

*Primary Examiner* — William H. Mayo, III
(74) *Attorney, Agent, or Firm* — IPUSA, PLLC

(57) ABSTRACT

A multicore cable includes a twisted wire portion including a plurality of Twinax cables and a plurality of coaxial cables, and a shield layer disposed on an outer periphery of the twisted wire portion. The twisted wire portion includes a first twisted wire layer and a second twisted wire layer in a cross section perpendicular to a longitudinal direction of the multicore cable. The first twisted wire layer is closest to the shield layer, and the second twisted wire layer is located on a center side from the first twisted wire layer and is adjacent to the first twisted wire layer. A closest Twinax cable is disposed in the second twisted wire layer. The closest Twinax cable is closest to the shield layer among the plurality of Twinax cables included in the twisted wire portion.

7 Claims, 12 Drawing Sheets

MULTICORE CABLE

CROSS-REFERENCE TO RELATED APPLICATIONS

This application claims priority to Japanese Patent Application No. 2021-127269 filed on Aug. 3, 2021, the entire contents of which are incorporated herein by reference.

BACKGROUND

1. Field of the Invention

The present disclosure relates to a multicore cable.

2. Description of the Related Art

Patent Document 1 describes a multicore cable including multiple wires each having an outer diameter of 0.2 mm to 0.6 mm and an outer sheath formed around the multiple wires, the outer sheath having a base layer formed of a thermoplastic elastomer having type A shore durometer hardness of 60 to 80 as a main component and an outer coating layer that is located outside the base layer and that is formed of polyethylene as a main component.

A multicore cable that assembles and combines multiple coaxial cables and the like is used as a cable connected to a medical device such as an ultrasonic diagnostic device.

In recent years, there is a demand for the multicore cable including coaxial cables having different structures and two-core coaxial cables, which are also called Twinax cables, as cables for connecting to probes, connectors, and the like of medical devices.

Such multicore cables may be bent repeatedly during use, and the flex resistance is required so that the cable does not break even if the cable is bent repeatedly.

Thus, it is desirable to provide a multicore cable having better flex resistance.

RELATED ART DOCUMENT

Patent Document

[Patent Document 1] Japanese Laid-open Patent Application Publication No. 2018-073741

SUMMARY

A multicore cable according to the present disclosure includes a twisted wire portion including a plurality of Twinax cables and a plurality of coaxial cables, and a shield layer disposed on an outer periphery of the twisted wire portion. The twisted wire portion includes a first twisted wire layer and a second twisted wire layer in a cross section perpendicular to a longitudinal direction of the multicore cable. The first twisted wire layer is closest to the shield layer, and the second twisted wire layer is located on a center side from the first twisted wire layer and is adjacent to the first twisted wire layer. A closest Twinax cable is disposed in the second twisted wire layer. The closest Twinax cable is closest to the shield layer among the plurality of Twinax cables included in the twisted wire portion.

According to at least one embodiment of the present disclosure, a multicore cable having better flex resistance can be provided.

BRIEF DESCRIPTION OF THE DIAGRAMS

DETAILED DESCRIPTION

Figure 1:
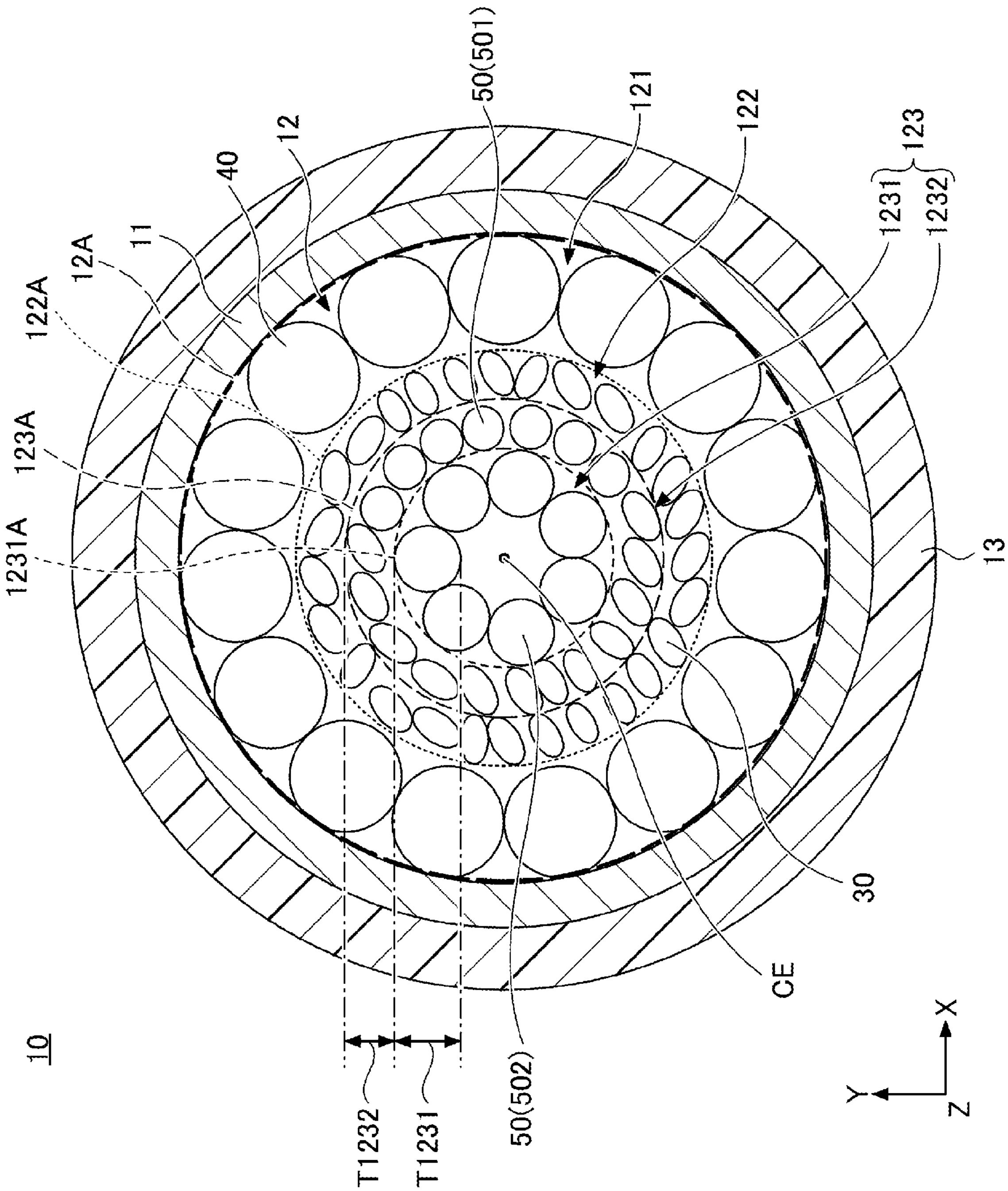
FIG. 1 is a cross-sectional view in a plane perpendicular to a longitudinal direction of a multicore cable according to an embodiment of the present disclosure.

Embodiments will be described below.

Description of the Embodiment of the Present Disclosure

Embodiments of the present disclosure will first be listed and described. In the following description, the same or corresponding elements are referenced by the same reference signs and the description thereof is not repeated.

(1) A multicore cable according to one embodiment of the present disclosure includes a twisted wire portion including a plurality of Twinax cables and a plurality of coaxial cables, and a shield layer disposed on an outer periphery of the twisted wire portion. The twisted wire portion includes a first twisted wire layer and a second twisted wire layer in a cross section perpendicular to a longitudinal direction of the multicore cable. The first twisted wire layer is closest to the shield layer, and the second twisted wire layer is located on a center side from the first twisted wire layer and is adjacent to the first twisted wire layer. A closest Twinax cable is disposed in the second twisted wire layer. The closest Twinax cable is closest to the shield layer among the plurality of Twinax cables included in the twisted wire portion.

The Twinax cable that is closest to the shield layer among the plurality of Twinax cables in the twisted wire portion is disposed in the second twisted wire layer, so that the amount of expansion and contraction of the Twinax cable when the multicore cable is repeatedly bent can be reduced. Therefore, when the multicore cable is repeatedly bent, the load applied to the Twinax cable, which is easily broken in comparison with other cables, can be reduced, and thus the multicore cable having better flex resistance can be obtained.

(2) The twist pitch in the first twisted wire layer may be greater than the twist pitch in the second twisted wire layer.

The twist pitch in the first twisted wire layer located at the outermost layer of the twisted wire portion is greater than the twist pitch in the second twisted wire layer, so that the cables in the first twisted wire layer, in which the amount of expansion and contraction is greater when the multicore cable is bent, can be easily expanded and contracted. Therefore, the flex resistance of the multicore cable can be particularly improved.

(3) The first twisted wire layer may include only the above-described coaxial cable.

The first twisted wire layer includes only the coaxial cable, so that the flex resistance of the multicore cable can be particularly improved.

(4) The second twisted wire layer may include only the Twinax cable.

The second twisted wire layer includes only the Twinax cable, so that the productivity of producing the multicore cable can be improved.

(5) The twisted wire portion may include an insulated cable.

The multicore cable includes the insulated cable, so that the types of cables included therein are increased, and thus the multicore cable can be used in various applications.

(6) The twisted wire portion may include a third twisted wire layer. The third twisted wire layer may be located on the center side from the second twisted wire layer and disposed adjacent to the second twisted wire layer in the cross section perpendicular to the longitudinal direction of the multicore cable. The third twisted wire layer may include the insulated cable and the Twinax cable.

The third twisted wire layer includes the Twinax cable, so that the Twinax cable is especially not likely to break, and thus the multicore cable particularly having better flex resistance can be obtained. Additionally, the third twisted wire layer includes the insulated cable in addition to the Twinax cable, so that the multicore cable includes many types of cables, and thus the multicore cable that can be used for various applications can be obtained.

(7) The third twisted wire layer may include, from a center in the cross section perpendicular to the longitudinal direction of the multicore cable to outward in the cross section, a main twisted wire layer and a sub twisted wire layer. A twist pitch in the sub twisted wire layer may be greater than a twist pitch in the main twisted wire layer, and a thickness of the main twisted wire layer may be thicker than a thickness of the sub twisted wire layer.

The layer located on the outer periphery side of the multicore cable tends to have a greater amount of expansion and contraction when the multicore cable is repeatedly bent.

The twist pitch of the sub twisted wire layer in the third twisted wire layer is greater than the twist pitch of the main twisted wire layer, so that the cable in the sub twisted wire layer, in which the amount of expansion and contraction is greater than that of the main twisted wire layer when the multicore cable is bent, can be easily expanded and contracted. Therefore, the flex resistance of the multicore cable can be particularly improved.

Additionally, the thickness of the main twisted wire layer is thicker than the sub twisted wire layer, so that the cables located at the center side of the main twisted wire layer can be increased, thereby particularly improving the flex resistance of the multicore cable.

Details of the Embodiment of the Present Disclosure

A specific example of a multicore cable according to one embodiment of the present disclosure (hereinafter, referred to as "the present embodiment") will be described below with reference to the drawings. It should be understood that the invention is not limited to these examples, but is intended to be indicated by the appended claims, and to include all modifications within the scope of the claims and the meaning and scope of the equivalents of the claims.

(Multicore Cable)

Figure 2:
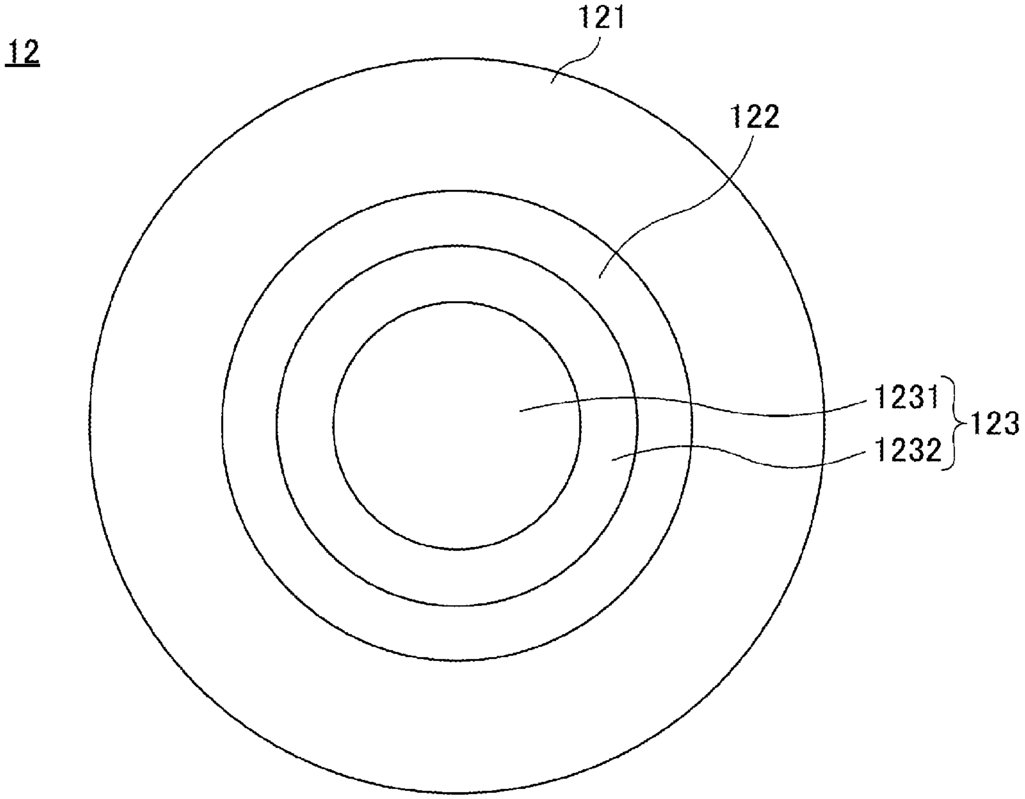
FIG. 2 is an explanatory drawing of a structure of a twisted wire portion of the multicore cable according to the embodiment of the present disclosure.
Figure 3A:
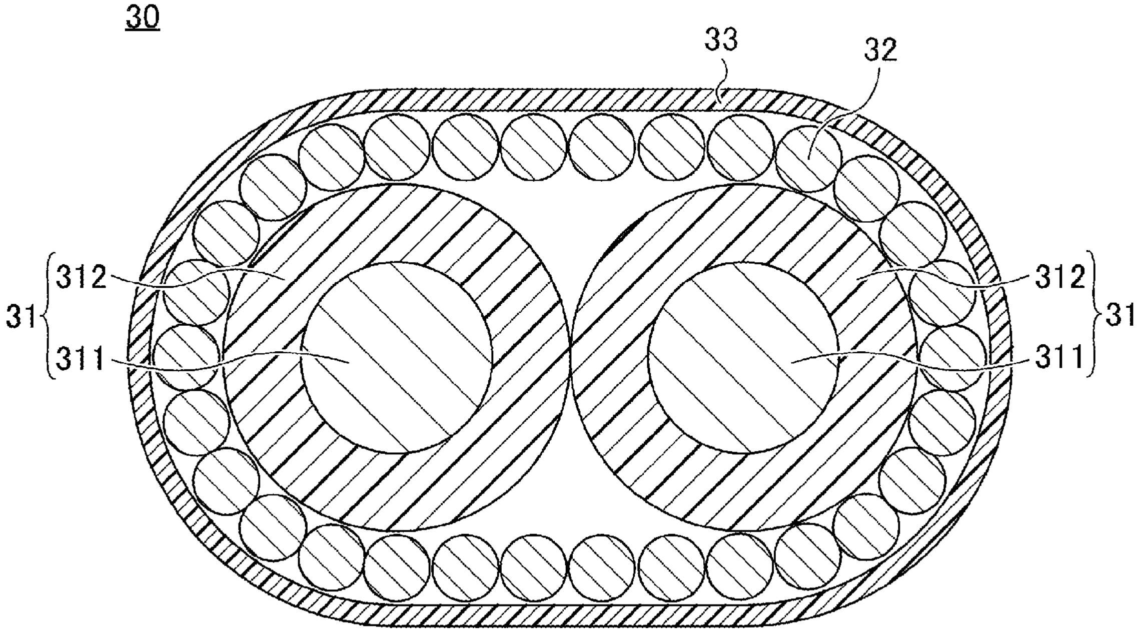
FIG. 3A is an explanatory drawing of a Twinax cable.
Figure 3B:
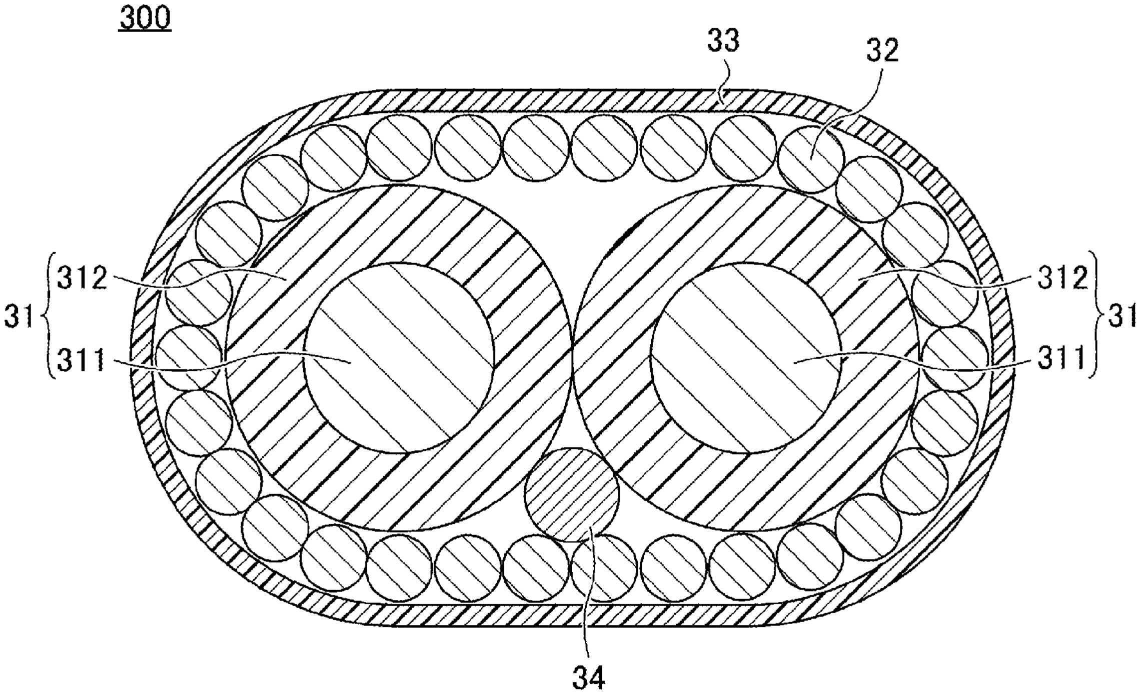
FIG. 3B is an explanatory drawing of the Twinax cable.
Figure 4:
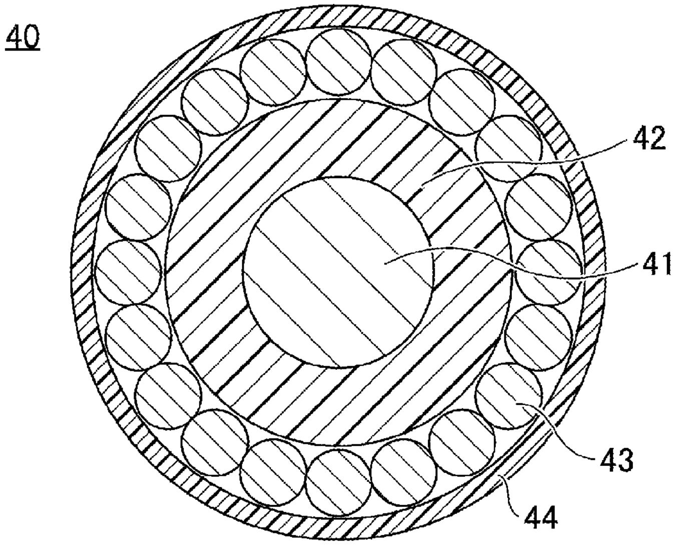
FIG. 4 is an explanatory drawing of a coaxial cable.
Figure 5:
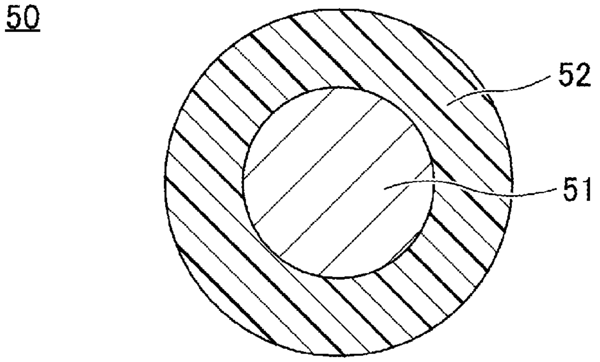
FIG. 5 is an explanatory drawing of an insulated cable.

FIG. 1 illustrates a structure example in a cross section of the multicore cable according to the present embodiment, perpendicular to the longitudinal direction of the multicore cable. FIG. 2 illustrates an explanatory diagram of a structure of a twisted wire portion of the multicore cable according to the present embodiment. FIG. 3A and FIG. 3B illustrate a structure example in a cross section of a Twinax cable included in the multicore cable according to the present embodiment, perpendicular to the longitudinal direction of the Twinax cable. FIG. 4 illustrates a structure example in a cross section of a coaxial cable included in the multicore cable according to the present embodiment, perpendicular to the longitudinal direction of the coaxial cable. FIG. 5 illustrates a structure example in a cross section of an insulated cable included in the multicore cable according to the present embodiment, perpendicular to the longitudinal direction of the insulated cable. FIGS. 6A, 6B, 7A and 7B illustrate explanatory diagrams indicating changes in the Twinax cable when the multicore cable is bent. FIG. 8 illustrates an explanatory diagram of the twist pitch. The multicore cable according to the present embodiment will be described below with reference to FIGS. 1 to 8.

FIG. 1 is a cross-sectional view in a plane perpendicular to a longitudinal direction of a multicore cable 10 according to the present embodiment. In FIG. 1, the Z-axis direction, which is perpendicular to the paper plane, is the longitudinal direction, and the XY-plane is a plane perpendicular to the longitudinal direction.

As illustrated in FIG. 1, the multicore cable 10 of the present embodiment may include a Twinax cable 30 and a coaxial cable 40. The multicore cable 10 includes a twisted wire portion 12 including multiple Twinax cables 30 and multiple coaxial cables 40, and a shield layer 11 disposed around the outer periphery of the twisted wire portion 12.

Respective members included in the multicore cable according to the present embodiment will be described.

(A) Twisted Wire Portion

The twisted wire portion 12 may include multiple Twinax cables 30 and multiple coaxial cables 40.

Here, members included in the twisted wire portion 12 will be first described.

(A-1) Cables Included in the Twisted Wire Portion

The twisted wire portion may include the Twinax cables and the coaxial cables as described above. Additionally, the twisted wire portion may include an insulated cable if necessary.

(A-1-1) Twinax Cable

FIG. 3A is a cross-sectional view of the Twinax cable 30 in a plane perpendicular to the longitudinal direction of the Twinax cable 30.

As illustrated in FIG. 3A, the Twinax cable 30 may include two signal wires 31 and shield conductor 32 that cover the outer periphery of the two signal wires 31. On the outer periphery of the shield conductor 32, an outer sheath 33 may also be provided.

Each signal wire 31 may include an inner conductor 311 and an insulator 312 that covers the outer periphery of the inner conductor 311.

Examples of the material of the inner conductor 311 include copper, aluminum, copper alloy, and the like. The inner conductor 311 may be plated with silver or tin on its surface. Therefore, for example, a silver-plated copper alloy or a tin-plated copper alloy may be used as the inner conductor 311. The inner conductor 311 may be a single wire or a twisted wire in which multiple wires are twisted together.

A material forming the insulator 312 is not particularly limited, but a resin, such as a fluorine resin, such as polytetrafluoroethylene (PTFE), tetrafluoroethylene-perfluoroalkyl vinyl ether copolymer (PFA), tetrafluoroethylene-hexafluoropropylene copolymer (FEP), or ethylene-tetrafluoroethylene copolymer (ETFE), or a polyester resin such as polyethylene terephthalate (PET) can be used.

The two signal wires 31 may be untwisted and arranged side by side as illustrated in FIG. 3A.

The shield conductor 32 has a structure in which metal wires are arranged in a spiral or braid structure around the outer periphery of two signal wires 31. As the material of the metal wire of the shield conductor 32, copper, aluminum, copper alloy, or the like may be used. The metal wires of the shield conductor 32 may be plated with silver or tin on its surface. Therefore, for example, a silver-plated copper alloy or a tin-plated copper alloy may be used as the metal wires of the shield conductor 32.

Although the material of the outer sheath 33 is not particularly limited, a resin such as a fluorine resin or a polyester resin described above in the insulator 312 can be used.

The structure of the Twinax cable 30 is not limited to the structure illustrated in FIG. 3A. As the Twinax cable 300 illustrated in FIG. 3B, for example, an additional drain wire 34 may be included. The drain wire 34 may be disposed in an area surrounded by two signal wires 31 and the shield conductors 32. The material of the drain wire 34 is not particularly limited, but a material substantially the same as the material of the inner conductor 311 described above can be used, for example.

The Twinax cable may be arranged in the twisted wire portion without twisting the Twinax cable. The Twinax cable may also be arranged in the twisted wire portion as a unit in which multiple Twinax cables are helically twisted along the longitudinal direction.

The twisted wire portion 12 may include multiple Twinax cables 30, but may contain only one type of Twinax cable having the same configuration, such as the outer diameter of the inner conductor, the material of each portion, and the outer diameter. The twisted wire portion 12 may include two or more types of Twinax cables having different above-described configurations.

As described above, the Twinax cable 30 may be arranged in the twisted wire portion 12 as the unit in which multiple twisted cables are twisted together. The twisted wire portion 12 may also include multiple units of the Twinax cables. In this case, the twisted wire portion 12 may be configured to include units each including only one type of Twinax cable having the same twist condition, such as the number of the twisted Twinax cables, the twist pitch, and a condition of the included Twinax cable, when forming the unit. Additionally, the twisted wire portion 12 may be configured to include units each including multiple types of Twinax cables having different twist conditions described above.

(A-1-2) Coaxial Cable

As illustrated in FIG. 4, the coaxial cable 40 includes an inner conductor 41, an insulator 42, a shield conductor 43, and an outer sheath 44 in a cross section perpendicular to the longitudinal direction, in the order from the center.

The inner conductor 41 is used as a central conductor of the coaxial cable 40. Examples of the material of the inner conductor 41 include copper, aluminum, copper alloy, and the like. The inner conductor may be plated with silver or tin on its surface. Therefore, as the inner conductor 41, a silver-plated copper alloy or a tin-plated copper alloy may be used, for example. The inner conductor 41 may be a single wire or a twisted wire in which multiple wires are twisted together.

The material forming the insulator 42 is not particularly limited, but a resin, such as a fluorine resin such as polytetrafluoroethylene (PTFE), tetrafluoroethylene-perfluoroalkyl vinyl ether copolymer (PFA), tetrafluoroethylene-hexafluoropropylene copolymer (FEP), or ethylene-tetrafluoroethylene copolymer (ETFE), or a polyester resin such as polyethylene terephthalate (PET) can be used.

The shield conductor 43 has a structure in which metal wires are arranged in a spiral or braid structure around the outer periphery of the insulator 42. As the material of the metal wire of the shield conductor 43, copper, aluminum, copper alloy, or the like may be used. The metal wire of the shield conductor may be plated with silver or tin on its surface. Therefore, as the metal wire of the shield conductor, a silver-plated copper alloy or a tin-plated copper alloy may be used, for example.

Although the material of the outer sheath 44 is not particularly limited, a resin such as a fluorine resin or a polyester resin described above in the insulator 42 can be used.

The coaxial cable can be arranged in the twisted wire portion without twisting a single-wire coaxial cable, or multiple coaxial cables can be arranged in the twisted wire portion as a unit in which multiple coaxial cables are helically twisted along the longitudinal direction.

The twisted wire portion 12 may include multiple coaxial cables 40, but may include only one type of coaxial cable having the same configuration, such as the outer diameter of the inner conductor, the material of each portion, and the outer diameter. The twisted wire portion 12 may include two or more types of coaxial cables having different above-described configurations.

As described above, the coaxial cable 40 may be arranged in the twisted wire portion 12 as a unit in which multiple coaxial cables are twisted together. The twisted wire portion 12 may also include multiple coaxial cable units. In this case, the twisted wire portion 12 may be configured to include only a unit of one type of coaxial cable having the same twist condition, such as the number of the twisted coaxial cables, the twist pitch, and the condition of the included coaxial cable, when forming the unit. Alternatively, the twisted wire portion 12 may be configured to include a unit of multiple coaxial cables having different above-described twist conditions.

(A-1-3) Insulated Cable

The multicore cable 10 of the present embodiment may further include an insulated cable 50. The insulated cable 50 may be arranged in the twisted wire portion 12. That is, the twisted wire portion 12 may also include the insulated cable 50.

The multicore cable 10 includes the insulated cable, so that the types of the included cables are increased, and thus the multicore cable can be used for various applications.

The insulated cable 50 includes an inner conductor 51 and an insulator 52 in a cross section perpendicular to the longitudinal direction in the order from the center.

Examples of the material of the inner conductor 51 include copper, aluminum, copper alloy, and the like. The inner conductor 51 may be plated with silver or tin on its surface. Therefore, as the inner conductor, a silver-plated copper alloy or a tin-plated copper alloy may be used, for example. The inner conductor 51 may be a single wire or a twisted wire in which multiple wires are twisted together.

The material forming the insulator 52 is not particularly limited, but a resin, such as a fluorine resin, such as polytetrafluoroethylene (PTFE), tetrafluoroethylene-perfluoroalkyl vinyl ether copolymer (PFA), tetrafluoroethylene-hexafluoropropylene copolymer (FEP), or ethylene-tetrafluoroethylene copolymer (ETFE), or a polyester resin such as polyethylene terephthalate (PET) can be used.

The insulated cable may be arranged in the twisted wire portion without twisting the single-wire insulated cable. Multiple insulated cables may be arranged in the twisted wire portion as a unit in which multiple insulated cables are helically twisted along the longitudinal direction.

The twisted wire portion 12 may include multiple insulated cables 50, but may include only one type of insulated cable having the same configuration, such as the outer diameter of the inner conductor, the material of each portion, and the outer diameter. The twisted wire portion 12 may include two or more types of insulated cables having different above-described configurations.

As described above, the insulated cable 50 may be arranged in the twisted wire portion 12 as a unit in which multiple insulated cables are twisted together. The twisted wire portion 12 may also include multiple units of the insulated cable. In this case, the twisted wire portion 12 may be configured to include only a unit of one type of insulated cable having the same twist condition, such as the number of the twisted insulated cables, the twist pitch, and the condition of the included insulated cable, when forming the unit. Alternatively, the twisted wire portion 12 may be configured to include a unit of multiple types of insulated cables having different above-described twist conditions.

(A-2) Arrangement in the Twisted Wire Portion

The inventor of the present disclosure has investigated a multicore cable, having better flex resistance, that suppresses the occurrence of breaking of the cables constituting the multicore cable even when the multicore cable is repeatedly bent.

As described above, the multicore cable of the present embodiment may include the Twinax cable and the coaxial cable, and include the insulated cable if necessary. According to the investigation of the inventor of the present disclosure, when the multicore cable is repeatedly bent, the Twinax cable is more easily broken than other cables such as the coaxial cable and the insulated cable. The present disclosure has been completed by finding that the arrangement of the Twinax cable within the multicore cable changes the ease of breaking of the Twinax cable and changes a property of the flex resistance of the multicore cable.

(A-2-1) about Respective Layers Included in the Twisted Wire Portion

The arrangement of the cables in the twisted wire portion 12 included in the multicore cable according to the present embodiment will be described with reference to FIG. 1 and FIG. 2. FIG. 2 is a diagram illustrating the arrangement of respective layers included in the twisted wire portion 12 and schematically illustrates respective layers in the twisted wire portion 12 in a cross section perpendicular to the longitudinal direction of the multicore cable 10 illustrated in FIG. 1. In FIG. 2, each cable is not illustrated.

(First Twisted Wire Layer and Second Twisted Wire Layer)

As illustrated in FIG. 1, in a cross section perpendicular to the longitudinal direction of the multicore cable 10 of the present embodiment, the twisted wire portion 12 may include multiple cables. In the twisted wire portion 12, the cables can be arranged so that the cables form multiple layers concentrically arranged, in a cross section perpendicular to the longitudinal direction of the multicore cable 10. As illustrated in FIG. 1 and FIG. 2, the twisted wire portion 12 may include, for example, a first twisted wire layer 121 and a second twisted wire layer 122.

The first twisted wire layer 121 may be disposed closest to the shield layer 11 within the twisted wire portion 12. That is, the first twisted wire layer 121 is a layer located on the outermost surface side of the twisted wire portion 12. Therefore, the first twisted wire layer 121 may also be a layer including cables exposed on the outer surface of the twisted wire portion 12. As illustrated in FIG. 1, the first twisted wire layer 121 may include cables arranged in a region surrounded by an outer surface 12A of the twisted wire portion 12 and a dotted line 122A, which is a circle passing through an outer surface of the second twisted wire layer.

The second twisted wire layer 122 may be disposed on the center CE side from the first twisted wire layer 121 and adjacent to the first twisted wire layer 121, in a cross section perpendicular to the longitudinal direction of the multicore cable 10. Therefore, the second twisted wire layer 122 may also be a layer including cables exposed when the cables included in the first twisted wire layer 121 is removed. As illustrated in FIG. 1, the second twisted wire layer 122 may include cables arranged in a region surrounded by the dotted line 122A, which is a circle passing through the outer surface of the second twisted wire layer 122, and a dashed line 123A, which is a circle passing through an outer surface of a third twisted wire layer 123 when the third twisted wire layer 123 is provided.

It is preferable that the cables included in the first twisted wire layer 121 are helically twisted together along the longitudinal direction of the twisted wire portion 12. Additionally, it is preferable that the cables included in the second twisted wire layer 122 are helically twisted together along the longitudinal direction of the twisted wire portion 12.

In this case, it is preferable that the twist direction of the cables included in the first twisted wire layer 121 is the same as the twist direction of the cables included in the second twisted wire layer. This is because the flex resistance when the multicore cable is bent can be particularly improved by using the same twist directions, and the productivity of the multicore cable can be also improved.

(Third Twisted Wire Layer)

Depending on the number of the cables included in the multicore cable 10, the outer diameter of the twisted wire portion, the size of the cable, and the like, the twisted wire portion 12 may further include the third twisted wire layer 123.

The third twisted wire layer 123 may be disposed on the center CE side from the second twisted wire layer 122 and adjacent to the second twisted wire layer 122, in a cross section perpendicular to the longitudinal direction of the multicore cable 10. Therefore, the third twisted wire layer 123 may also be a layer including cables that remain when the cables included in the first twisted wire layer 121 and the second twisted wire layer 122 are removed. As illustrated in FIG. 1, the third twisted wire layer 123 may include cables arranged in a region surrounded by the dashed line 123A, which is a circle passing through the outer surface of the third twisted wire layer 123.

The third twisted wire layer 123 may include multiple layers, and the third twisted wire layer 123 may include a main twisted wire layer 1231 and a sub twisted wire layer 1232 from the center CE side in the cross section perpendicular to the longitudinal direction of the multicore cable, for example. The sub twisted wire layer 1232 may include cables arranged in a region surrounded by the dashed line 123A, which is a circle passing through the outer surface of the third twisted wire layer 123, and a dashed line 1231A, which is a circle passing through the outer surface of the main twisted wire layer 1231. The main twisted wire layer 1231 may include cables arranged in an area surrounded by the dashed line 1231A, which is the circle passing through the outer surface of the main twisted wire layer 1231.

The third twisted wire layer 123 includes the main twisted wire layer 1231 and the sub twisted wire layer 1232, and thus the multicore cable 10 includes more cables, so that the multicore cable 10 can be used for various applications.

Additionally, although the thickness T1231 of the main twisted wire layer 1231 and the thickness T1232 of the sub twisted wire layer 1232 are not particularly limited, the thickness T1231 of the main twisted wire layer 1231 is preferably thicker than the thickness T1232 of the sub twisted wire layer 1232, for example.

This is because the thickness T1231 of the main twisted wire layer 1231 is thicker than that of the sub twisted wire layer 1232, so that the number of the cables located on the center CE side is increased, thereby particularly improving the flex resistance of the multicore cable.

It is preferable that the cables included in the third twisted wire layer 123 are helically twisted together along the longitudinal direction of the twisted wire portion 12.

In this case, it is preferable that the twist direction of the cables included in the third twisted wire layer 123 is the same as the twist direction of the cables respectively included in the first twisted wire layer 121 and the second twisted wire layer 122. This is because the flex resistance when the multicore cable is bent can be particularly improved by using the same twist directions, and the productivity of the multicore cable can be also improved.

Here, when the third twisted wire layer 123 includes the main twisted wire layer 1231 and the sub twisted wire layer 1232, it is preferable that the cables included in each layer are helically twisted together along the longitudinal direction of the twisted wire portion 12.

In this case, it is preferable that the respective twist directions of the cables included in the first twisted wire layer 121, the second twisted wire layer 122, the main twisted wire layer 1231 of the third twisted wire layer, and the sub twisted wire layer 1232 of the third twisted wire layer are the same direction. This is because the flex resistance when the multicore cable is bent can be particularly improved by using the same twist directions, and the productivity of the multicore cable can be also improved.

As described above, with respect to the Twinax cable 30, the coaxial cable 40, and the insulated cable 50, multiple cables may be arranged in the twisted wire portion 12 as units in each of which multiple cables are twisted together. In this case, the twist direction in each unit is not particularly limited and can be any direction. For example, the twist direction of each unit may be the same as the twist direction in a corresponding layer. Specifically, the twist direction in each unit, the twist direction in the first twisted wire layer 121, the twist direction in the second twisted wire layer 122, the twist direction in the main twisted wire layer 1231 of the third twisted wire layer, and the twist direction in the sub twisted wire layer 1232 of the third twisted wire layer may be the same.

(A-2-2) Arrangement of the Twinax Cables

Among the multiple Twinax cables 30 included in the twisted wire portion 12, the Twinax cables 30 closest to the shield layer 11 can be disposed in the second twisted wire layer 122. That is, the Twinax cables 30 can be disposed in a layer on the center CE side from the first twisted wire layer 121, which is the outermost layer of the twisted wire portion 12.

As described above, when the multicore cable is repeatedly bent, the Twinax cable is more easily broken than other cables. According to the inventor of the present disclosure, when the Twinax cable is disposed on the outermost layer of the twisted wire portion included in the multicore cable, the Twinax cable is easily broken. The Twinax cable is disposed on the center side from the outermost layer, so that the occurrence of breaking can be suppressed.

Figure 6A:
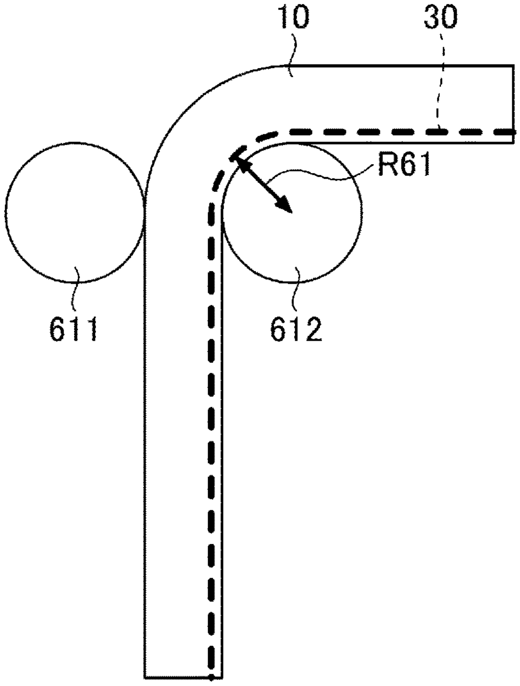
FIG. 6A is an explanatory diagram of a state of the Twinax cable when the multicore cable is bent in a first direction.
Figure 6B:
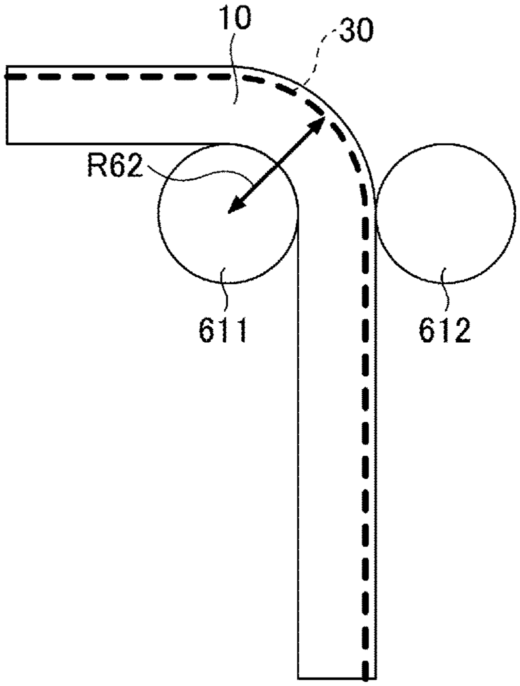
FIG. 6B is an explanatory diagram of a state of the Twinax cable when the multicore cable is bent in a second direction.

FIG. 6A and FIG. 6B schematically illustrate a case in which the Twinax cable 30 is disposed in the outermost layer of the twisted wire portion 12, i.e., the first twisted wire layer 121, and the multicore cable 10 including the twisted wire portion 12 is bent.

FIG. 6A illustrates a state in which the multicore cable 10 is vertically positioned and sandwiched between a first mandrel 611 and a second mandrel 612 that are horizontally positioned and parallel to each other, and is horizontally bent by 90° such that the right end of the multicore cable 10 is in contact with the upper side of the second mandrel 612.

FIG. 6B illustrates a state in which the multicore cable of FIG. 6A is horizontally bent by 90° such that the left end of the multicore cable is in contact with the upper side of the first mandrel 611.

In the case of FIG. 6A, near the second mandrel 612, the Twinax cable 30 in the multicore cable 10 is bent to be formed in a curve having a curvature radius R61 centered on the center of the second mandrel 612. In the case of FIG. 6B, near the first mandrel 611, the Twinax cable 30 in the multicore cable 10 is bent to be formed in a curve having a curvature radius R62 centered on the center of the first mandrel 611.

As is apparent from the comparison between FIG. 6A and FIG. 6B, when the Twinax cable is disposed in the outermost layer of the twisted wire portion 12, the curvature radius of the Twinax cable 30 in the bent portion changes greatly depending on the bending direction when the multicore cable 10 including the twisted wire portion 12 is bent. That is, when the multicore cable is repeatedly bent, the amount of expansion and contraction of the Twinax cable included in the multicore cable is greater.

Figure 7A:
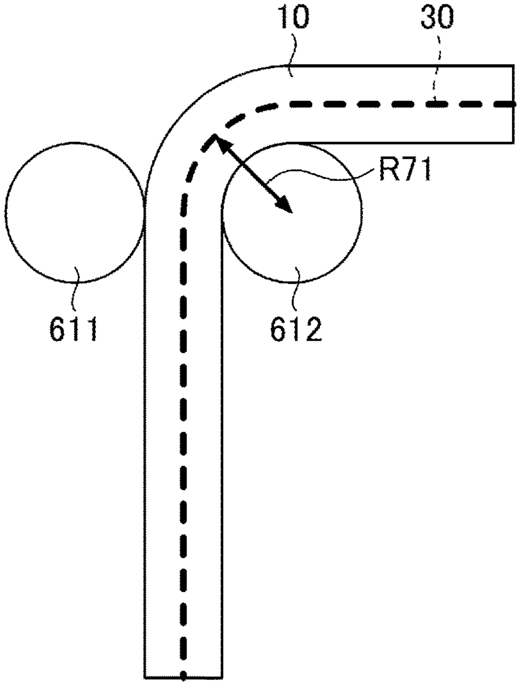
FIG. 7A is an explanatory diagram of a state of the Twinax cable when the multicore cable is bent in the first direction.
Figure 7B:
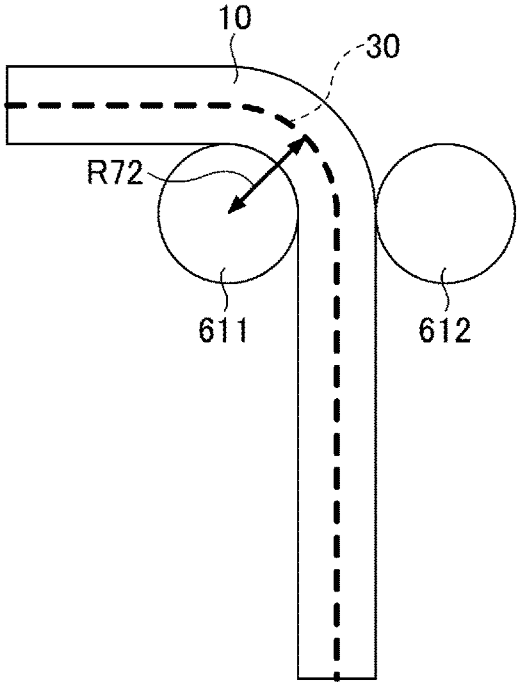
FIG. 7B is an explanatory diagram of a state of the Twinax cable when the multicore cable is bent in the second direction.
Figure 8:
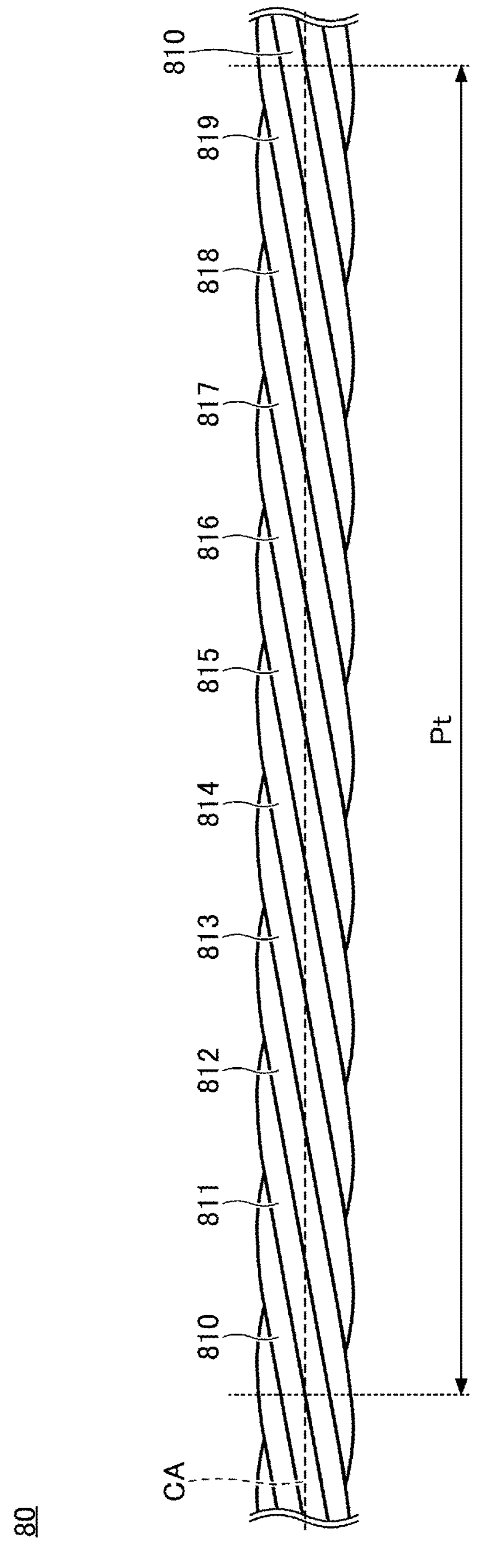
FIG. 8 is an explanatory diagram of a twist pitch.

FIG. 7A and FIG. 7B schematically illustrate a case in which the Twinax cable 30 is disposed on the center side from the outermost layer of the twisted wire portion 12, i.e., in a layer other the first twisted wire layer 121, such as the second twisted wire layer 122, and the multicore cable 10 including the twisted wire portion 12 is bent.

FIG. 7A illustrates the multicore cable 10 vertically positioned and sandwiched between the first mandrel 611 and the second mandrel 612 that are horizontally positioned and parallel to each other, and the multicore cable 10 is horizontally bent by 90° such that the right end of the multicore cable 10 is in contact with the upper side of the second mandrel 612.

FIG. 7B illustrates a state in which the multicore cable of FIG. 7A is horizontally bent 90° such that the left end of the multicore cable is in contact with the upper side of the first mandrel 611.

In the case of FIG. 7A, near the second mandrel 612, the Twinax cable 30 in the multicore cable 10 is bent to be formed in a curve having a curvature radius R71 centered on the center of the second mandrel 612. In the case of FIG. 7B, near the first mandrel 611, the Twinax cable 30 in the multicore cable 10 is bent to be formed in a curve having a curvature radius R72 centered on the center of the first mandrel 611. However, as is apparent from FIG. 7A and FIG. 7B, the difference between the curvature radius R71 and the curvature radius R72 can be reduced relative to the difference between the curvature radius R61 and the curvature radius R62 described above.

It is found based on the comparison of FIGS. 6A-7B that the Twinax cable is disposed on the center side from the outermost layer of the twisted wire portion 12, so that the change in the radius of curvature of the Twinax cable at the bent portion due to the direction of bending, caused when the multicore cable 10 including the twisted wire portion 12 is bent, can be suppressed. That is, it is found that, as illustrated in FIG. 7A and FIG. 7B, when the Twinax cable is disposed on the center side from the outermost layer of the twisted wire portion, the amount of expansion and contraction of the Twinax cable at repeated bending can be reduced in comparison with the case in which the Twinax cable is disposed in the first twisted wire layer, as illustrated in FIG. 6A and FIG. 6B.

As described above, among the multiple Twinax cables 30 included in the twisted wire portion 12, the Twinax cables 30 that are closest to the shield layer 11 are disposed within the second twisted wire layer 122, thereby reducing the amount of expansion and contraction of the Twinax cable 30 when the multicore cable is repeatedly bent. Therefore, when the multicore cable 10 is repeatedly bent, the load applied to the Twinax cable, which is easily broken compared to other cables, is reduced, so that the multicore cable having better flex resistance can be obtained.

(A-2-3) Arrangement Example of Cables in Each Twisted Wire Layer

With respect to the cables in the twisted wire portion 12, as long as the Twinax cables that are closest to the shield layer 11 among the multiple Twinax cables 30 included in the twisted wire portion 12 are disposed within the second twisted wire layer, other configurations are not particularly limited.

(About the First Twisted Wire Layer)

Apart from not including the Twinax cable 30, the first twisted wire layer 121 can have any configuration. The first twisted wire layer 121 may include one or more cables selected from, for example, the coaxial cable 40 and the insulated cable 50.

However, because the coaxial cable 40, in particular, is not easily broken even when the multicore cable 10 is repeatedly bent, it is preferable that the first twisted wire layer 121, in which the amount of expansion and contraction is greater when the multicore cable 10 is repeatedly bent, includes the coaxial cable 40.

The first twisted wire layer 121 may include only the coaxial cable 40. The first twisted wire layer 121 includes only the coaxial cable 40, so that the flex resistance of the multicore cable 10 is particularly improved.

Here, when the first twisted wire layer 121 includes only the coaxial cable, the first twisted wire layer may include only the coaxial cables having the same configuration, such as the outer diameter of the inner conductor, the material of each portion, the outer diameter of the coaxial cable, and the like. Additionally, the first twisted wire layer 121 may include two or more types of coaxial cables having different above-described configurations.

Additionally, the coaxial cables may be disposed in the first twisted wire layer 121 as a unit in which multiple coaxial cables are twisted together. In this case, the first twisted wire layer 121 may include only a unit of the coaxial cables having the same twist condition, such as the number of the twisted coaxial cables, the twist pitch, and the conditions of the included coaxial cables, when forming the unit. The first twisted wire layer 121 may be configured to include a unit of multiple types of coaxial cables having different above-described twist conditions.

(About the Second Twisted Wire Layer)

For example, as illustrated in FIG. 1, the second twisted wire layer 122 may include only the Twinax cables 30.

Only the Twinax cables are included in the second twisted wire layer 122, so that the productivity of producing the multicore cable 10 can be improved.

Here, in the case where the second twisted wire layer 122 includes only the Twinax cables, the second twisted wire layer may include only the Twinax cables having the same configuration, such as the outer diameter of the inner conductor, the material of each portion, the outer diameter of the signal wire, and the like. Additionally, the second twisted wire layer 122 may include two or more types of Twinax cables having different above-described configurations.

Additionally, the Twinax cables may be disposed in the second twisted wire layer 122 as a unit in which multiple Twinax cables are twisted together. In this case, the second twisted wire layer 122 may include only a unit of the Twinax cables having the same twist condition, such as the number of the twisted Twinax cables, the twist pitch, and the condition of the included Twinax cable, when forming the unit. The second twisted wire layer 122 may be configured to include a unit of multiple types of Twinax cables having different above-described twist conditions.

However, the second twisted wire layer 122 is not limited to the above-described form, and the second twisted wire layer 122 may include one or more cables selected from the coaxial cable 40 and the insulated cable 50, in addition to the Twinax cable 30.

(About the Third Twisted Wire Layer)

The multicore cable 10 according to the present embodiment may include the third twisted wire layer 123, as described above, depending on the number of included cables and the like. The third twisted wire layer 123 may include one or more types of cables selected from the Twinax cable, the coaxial cable, and the insulated cable described above.

However, it is preferable that the third twisted wire layer 123 located on the central side of the multicore cable includes one or more types of cables selected from the Twinax cable and the insulated cable, because even when the multicore cable is repeatedly bent, the coaxial cable, in particular, is not easily broken.

For example, as illustrated in FIG. 1, the third twisted wire layer 123 preferably includes the Twinax cable 30 and the insulated cable 50. The Twinax cable is included in the third twisted wire layer 123, so that the Twinax cable is not easily broken, and thus the multicore cable particularly having better flex resistant can be obtained. Additionally, the third twisted wire layer 123 includes the insulated cable in addition to the Twinax cable, so that the number of the included cables increases, and thus the multicore cable can be used for various applications.

Here, FIG. 1 illustrates an example in which the third twisted wire layer 123 includes a first insulated cable 501 and a second insulated cable 502 having different configurations, as the insulated cables 50, but the third twisted wire layer 123 is not limited to such a form. For example, the insulated cable included in the third twisted wire layer 123 may be configured to include only one type of insulated cables having the same configuration, such as the outer diameter of the inner conductor, the material of each portion, the outer diameter of the insulated cable 50, and the like, or include three or more types of insulated cables having different configurations.

FIG. 1 illustrates an example in which the third twisted wire layer 123 includes the Twinax cables having the same outer diameter of the inner conductor 311, the same material of each portion, the same outer diameter of the signal wire 31, and the like, i.e., the Twinax cables having the same configuration. However, the third twisted wire layer 123 is not limited to such a form. For example, the third twisted wire layer 123 is configured to include multiple types of Twinax cables having different above-described configurations.

Additionally, as described above, the insulated cable and the Twinax cable can be disposed in the third twisted wire layer 123 as units in each of which multiple cables are twisted together. In this case, the third twisted wire layer 123 may be configured to include only the units of the cables having the same twist conditions, such as the number of the twisted cables, the twist pitch, the condition of the included cable, and the like. The third twisted wire layer 123 may be configured to include units of multiple types of cables having different twist conditions.

(A-2-3) Twist Pitch

As described above, it is preferable that the cables included in each layer in the twisted wire portion 12 are helically twisted along the longitudinal direction of the twisted wire portion 12.

In this case, the twist pitch in each layer is not particularly limited, but it is preferable that the twist pitch in a layer located on the shield layer 11 side is greater than the twist pitch in a layer located on the center CE side. The twist pitch in the layer on the shield layer 11 side is increased, so that the cable in the layer on the shield layer 11 side, which has a large amount of expansion and contraction when the multicore cable 10 is bent, can be easily expanded and contracted. Thus, the flex resistance of the multicore cable 10 can be particularly improved.

For example, it is preferable that the twist pitch in the first twisted wire layer 121 is greater than the twist pitch in the second twisted wire layer 122. The twist pitch of the first twisted wire layer 121 located in the outermost layer of the twisted wire portion 12 is greater than the twist pitch of the second twisted wire layer 122, so that the cable in the first twisted wire layer 121, which has a large amount of expansion and contraction when the multicore cable 10 is bent, can be easily expanded and contracted. Thus, the flex resistance of the multicore cable 10 can be particularly improved.

In the case in which the multicore cable according to the present embodiment includes the third twisted wire layer 123, it is preferable that the twist pitch in the second twisted wire layer 122 is greater than the twist pitch in the third twisted wire layer 123. Additionally, when the third twisted wire layer 123 includes the main twisted wire layer 1231 and the sub twisted wire layer 1232, it is preferable that the twist pitch in the second twisted wire layer 122 is greater than the twist pitch in the sub twisted wire layer 1232. Further, it is preferable that the twist pitch in the sub twisted wire layer 1232 is greater than the twist pitch of the main twisted wire layer 1231.

Layers located on the outer periphery side of the multicore cable 10 tend to have a greater amount of expansion and contraction when the multicore cable 10 is repeatedly bent.

The twist pitch in the second twisted wire layer 122 is greater than the twist pitch in the third twisted wire layer 123, so that the cable in the second twisted wire layer 122, which has a greater amount of expansion and contraction than the third twisted wire layer 123 when the multicore cable 10 is bent, can be easily expanded and contracted. Thus, the flex resistance of the multicore cable 10 can be particularly improved.

Additionally, the twist pitch in the sub twisted wire layer 1232 included in the third twisted wire layer 123 is greater than the twist pitch of the main twisted wire layer 1231, so that the cable in the sub twisted wire layer 1232, which has a greater amount of expansion and contraction than the main twisted wire layer 1231 when the multicore cable 10 is bent, can be easily expanded and contracted. Thus, the flex resistance of the multicore cable 10 can be particularly improved.

As described above, the Twinax cable 30, the coaxial cable 40, and the insulated cable 50 may be disposed in the twisted wire portion 12 as units in each of which multiple cables are twisted together. In this case, the twist pitch in each unit is not particularly limited. For example, the twist pitch in each unit may be less than or equal to the twist pitch in each layer, i.e., the twist pitches of the first twisted wire layer 121, the second twisted wire layer 122, the main twisted wire layer 1231 of the third twisted wire layer, and the sub twisted wire layer 1232 of the third twisted wire layer.

The above-described twist pitch indicates a length in which a cable is twisted once. The length indicates a length along the central axis of the twisted wire portion 12.

FIG. 8 is a side view of a twisted wire 80. The twisted wire 80 has a configuration in which 10 cables of a cable 810 to a cable 819 in total are twisted.

In this case, as illustrated in FIG. 8, on the side of the twisted wire 80, the distance in the same cable along a central axis CA, for example, the distance in the cable 810 is a twist pitch Pt of the twisted wire 80.

The twist pitch can be measured by, for example, the method described in JIS C 3002 (1992).

(B) Shield Layer

As illustrated in FIG. 1, the multicore cable 10 of the present embodiment can include the shield layer 11 that covers the outer periphery of the twisted wire portion 12.

By providing the shield layer, noise introduced into a signal transmitted through the multicore cable and noise radiated to the outside can be cut.

The shield layer 11 has a structure in which a metal wire is wound in a spiral or braid structure around the outer periphery of the twisted wire portion 12. As the material of the metal wire of the shield layer 11, copper, aluminum, copper alloy, or the like may be used. The metal wire in the shield layer 11 may be plated with silver or tin on its surface. Thus, as the metal wire of the shield layer, a silver-plated copper alloy or a tin-plated copper alloy may be used, for example.

(C) Outer Sheath

The multicore cable 10 of the present embodiment may also include an outer sheath 13 disposed around the outer periphery of the shield layer 11. The outer sheath 13 is positioned to cover the outer periphery of the shield layer 11.

Although the material forming the outer sheath 13 is not particularly limited, a resin, such as a fluorine resin, such as polytetrafluoroethylene (PTFE), tetrafluoroethylene-perfluoroalkyl vinyl ether copolymer (PFA), tetrafluoroethylene-hexafluoropropylene copolymer (FEP), or ethylene-tetrafluoroethylene copolymer (ETFE), a polyester resin, such as polyethylene terephthalate (PET), or polyvinyl chloride (PVC) can be used.

By providing the outer sheath 13, the members constituting the multicore cable, such as the twisted wire portion 12 can be protected.

EXAMPLES

Although specific examples will be described below, the present invention is not limited to these examples.

(Evaluation Method)

First, a method of evaluating a multicore cable produced in the following examples will be described.

(1) Twist Pitch

The twist pitch was measured by the method described in JIS C 3002 (1992).

(2) Outer Diameter

The outer diameter of the multicore cable was measured using a micrometer. Specifically, the outer diameter was measured along two diameters of the multicore cable that are orthogonal to each other, in a cross section perpendicular to the longitudinal direction of the multicore cable. Then, the average value was defined as the outer diameter of the multicore cable.

(3) Flex Resistance Test

For the multicore cable obtained in the following experimental examples, the flex resistance test was performed in accordance with JIS C 6851 (2006) (Optical fiber cable test procedures).

Figure 9:
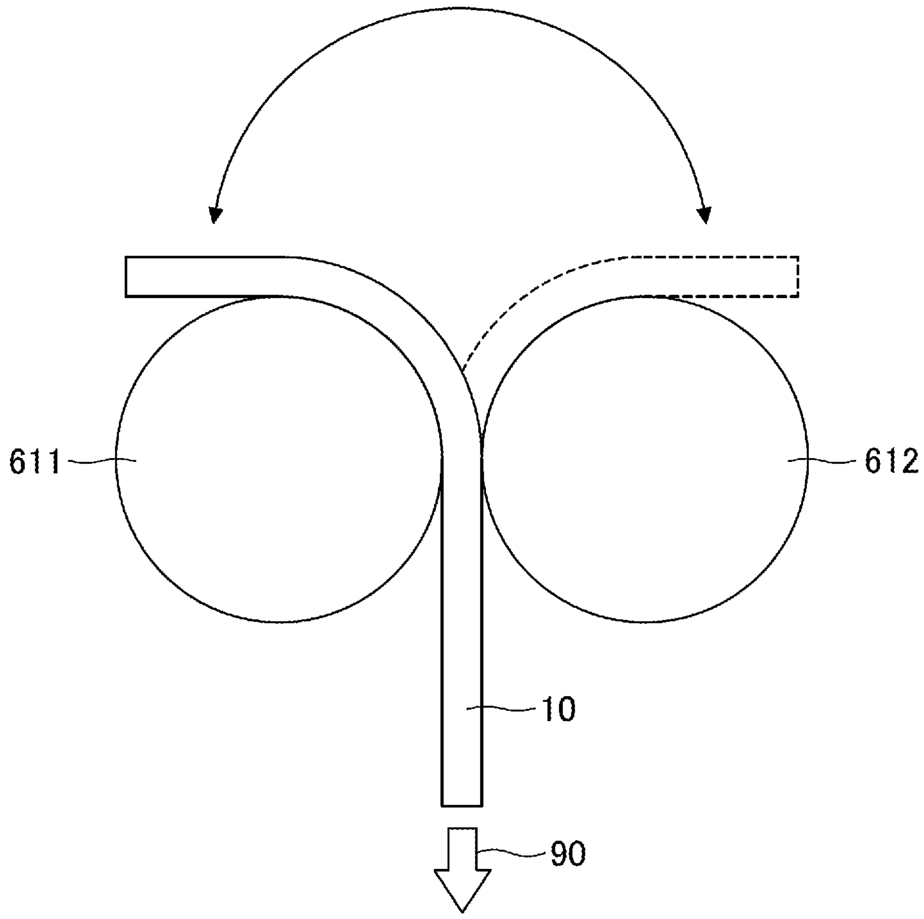
FIG. 9 is an explanatory diagram of a bending test.

Specifically, as illustrated in FIG. 9, the multicore cable 10 to be evaluated is vertically positioned and sandwiched between two of a first mandrel 611 and a second mandrel 612 that are horizontally arranged parallel to each other and that have a diameter of 60 mm. Then, a process, in which the multicore cable 10 is horizontally bent by 90° so that the left end of the multicore cable 10 is in contact with the upper side of the first mandrel 611, and then is horizontally bent by 90° so that the right end of the multicore cable 10 is in contact with the upper side of the second mandrel 612, is repeated. This repetition is performed while measuring the resistance values of the inner conductors of all cables in the multicore cable, and the number of times when, for any one of the cables, the resistance increases to 10 times or greater than the initial resistance is used as an index value of the flex resistance test. The number of bending times evaluated in the above-described flex resistance test is counted as one, each time the multicore cable 10 is bent to the left in FIG. 9, is bent to the right, and then is bent to the left to be returned. Here, during the flex resistance test, a load of 5 N is applied to the multicore cable 10 downward along the block arrow 90 in FIG. 9.

When the index value of the flex resistance test, i.e., the number of bending times is 250,000 or greater, it is determined to pass the flex resistance test.

(4) Torsion Characteristic Test

Figure 10:
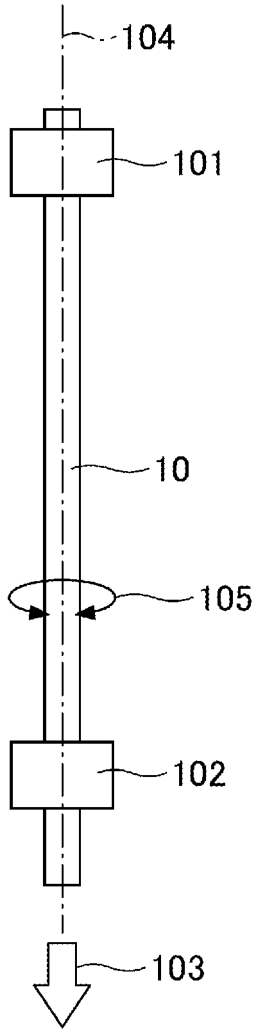
FIG. 10 is an explanatory diagram of a torsion test.

A test method for the torsional characteristic test will be described with reference to FIG. 10.

The multicore cable 10 having a length of 1 m produced in the following experimental example is vertically hung and the upper end and lower end of the multicore cable 10 are respectively grasped with chucks 101 and 102. Here, a load of 5 N is applied to the multicore cable 10 downward along the block arrow 103 in FIG. 10.

Then, in a state in which the chuck 102 at the lower end is fixed, the chuck 101 at the upper end is twisted about an axis 104 of the multicore cable 10 from −360° to +360° to the left and right along the double-headed arrow 105 at a rate of 30 rpm. The torsion characteristic test is performed while measuring the resistance values of the inner conductors of all the cables in the multicore cable, and the number of times is measured until the resistance increases to 10 times greater than the initial resistance for any one of the cables. Here, the number of twists is counted as one, each time the multicore cable 10 is twisted from −360° to +360°. As the number of twists increases, it is indicated that the torsion characteristic is improved.

When the evaluation value of the torsion characteristic test, i.e., the torsion frequency is 250,000 or greater, it is determined to pass the torsion characteristic test.

(5) Roller Test

Figure 11:
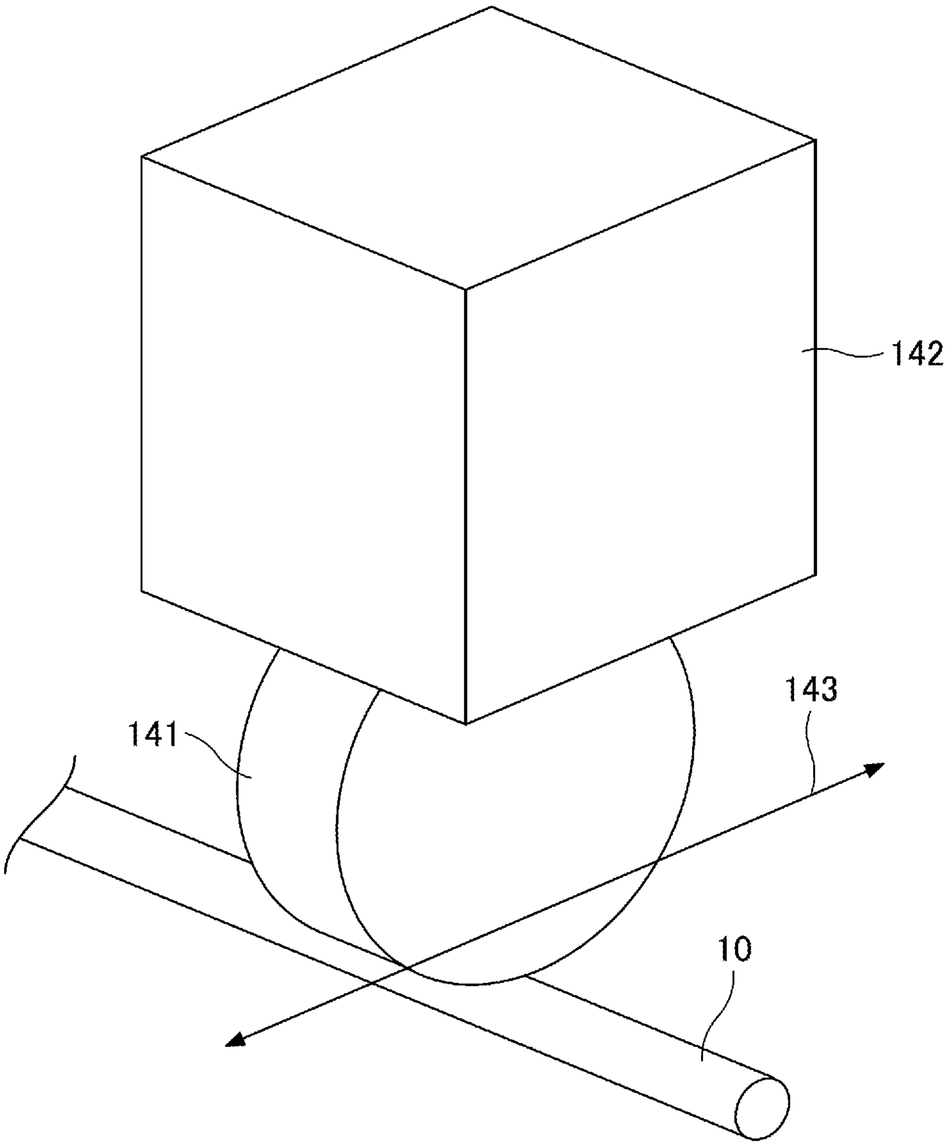
FIG. 11 is an explanatory diagram of a roller test.

The test method of the roller test will be described with reference to FIG. 11.

The multicore cable 10 produced in the following experimental example is fixed on a horizontal plane. Then, a roller 141, on which a weight 142 is loaded so that a load of 558.6 N is applied to the horizontal plane in the vertical direction, is reciprocated along the double-headed arrow 143, orthogonal to the longitudinal direction of the multicore cable 10. The roller test is performed while measuring the resistance values of all cables and the number of times is measured until the resistance increases to 10 times or greater than the initial resistance for any one of the cables. The number of reciprocation times is counted as one, each time the roller 141 reciprocates along the double-headed arrow 143. As the number of reciprocation times increases, it is indicated that the roller test characteristic is improved.

When the evaluation value of the roller test, i.e. the number of reciprocation times is 100 or greater, it is determined to pass the roller test.

In the following, the multicore cable in each experimental examples will be described. Experimental Example 1 is the embodiment and Experimental Example 2 is a comparative example.

Experimental Example 1

Figure 12:
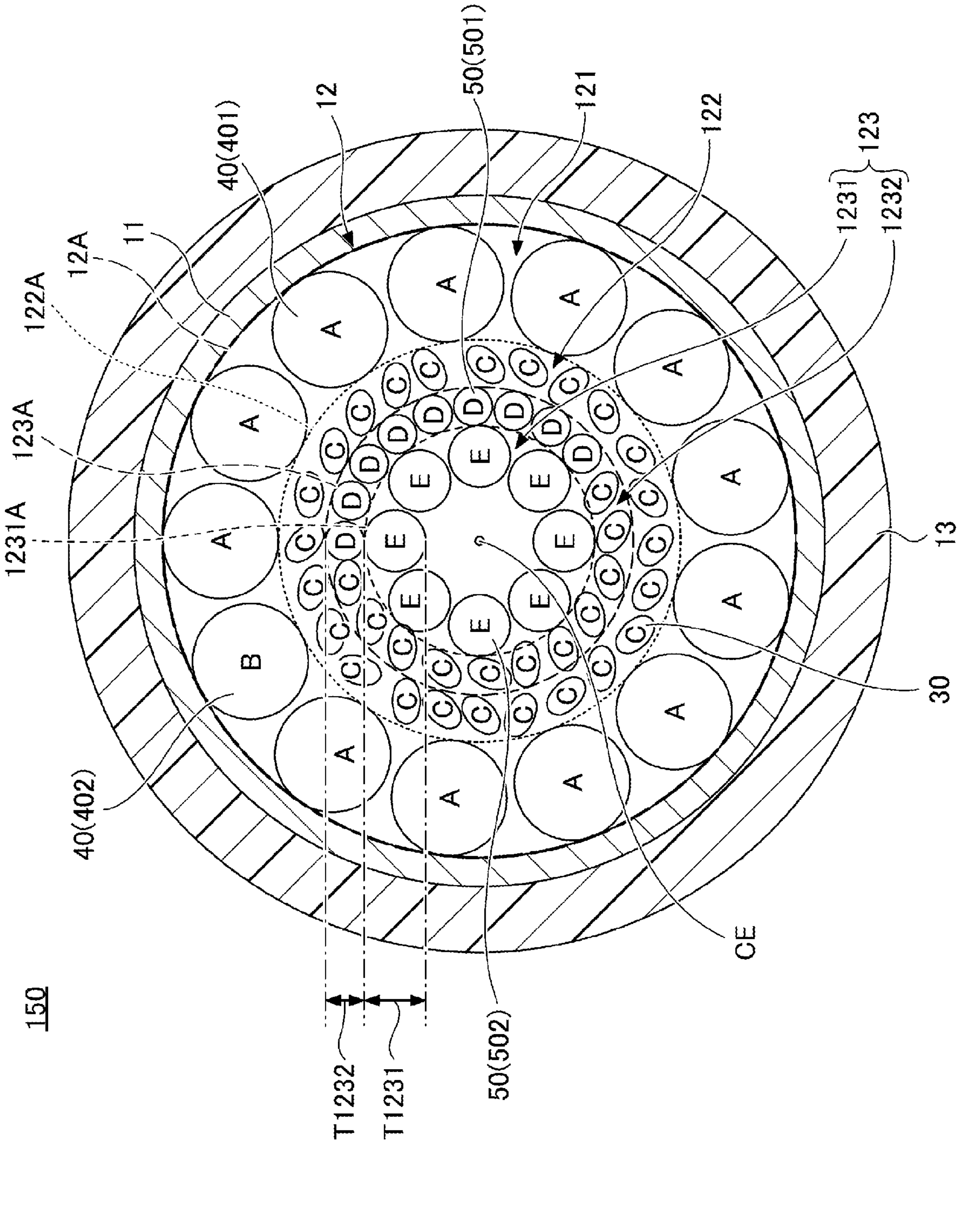
FIG. 12 is an explanatory diagram of a structure of a multicore cable produced in Experimental Example 1.

A multicore cable 150 having a structure illustrated in FIG. 12 in a cross section perpendicular to the longitudinal direction is produced by the following procedure.

The twisted wire portion 12 of the multicore cable 150 includes the first twisted wire layer 121, the second twisted wire layer 122, and the third twisted wire layer 123.

The first twisted wire layer 121 includes cables disposed in a region surrounded by the outer surface 12A of the twisted wire portion 12 and the dotted line 122A, which is the outer surface of the second twisted wire layer 122. Specifically, the first twisted wire layer 121 includes 12 sets of first coaxial cable units A, each of which is a unit of first coaxial cables 401, and one set of second coaxial cable units B, each of which is a unit of second coaxial cables 402. The configurations of the first coaxial cable unit A and the second coaxial cable unit B are indicated in Table 1. Both the first coaxial cable 401 and the second coaxial cable 402 have a cross-sectional structure substantially the same as the coaxial cable 40 illustrated in FIG. 4.

As indicated in column (A) of Table 1, the first coaxial cable unit A is a unit in which 16 of the first coaxial cables 401 are twisted together such that the twist direction is right-handed. The first coaxial cable 401 included in the first coaxial cable unit A is a coaxial cable with an inner conductor meeting the AWG 46 standard, that is, the first coaxial cable 401 is a coaxial cable with an inner conductor having an outer diameter of 0.03984 mm. AWG stands for American Wire Gauge and is a standard for electric wires designed by the Underwriters Laboratories Inc. (UL). Additionally, the twist pitch in the first coaxial cable unit A is 40 mm. Here, although specific values of each layer included in the twisted wire portion 12 and the twist pitch in each unit are indicated in the description of the experimental examples, the multicore cable of the present disclosure is not limited to such values.

As indicated in column (B) of Table 1, the second coaxial cable unit B is a unit in which eight of the second coaxial cables 402 are twisted together such that the twist direction is right-handed. The second coaxial cable 402 included in the second coaxial cable unit B is a coaxial cable with an inner conductor meeting the AWG 42 standard, that is, the second coaxial cable 402 is a coaxial cable with an inner conductor having an outer diameter of 0.06334 mm. The twist pitch in the second coaxial cable unit B is 30 mm.

Here, both the first coaxial cable 401 and the second coaxial cable 402 use a silver-plated copper alloy wire as the inner conductor and a tin-plated copper alloy wire as the shield conductor.

In the first twisted wire layer 121, the first coaxial cable unit A and the second coaxial cable unit B are twisted such that the twist direction is right-handed, and the twist pitch is 100 mm.

The second twisted wire layer 122 includes Twinax cables C disposed in a region surrounded by the dotted line 122A, which is the outer surface of the second twisted wire layer 122, and the dashed line 123A, which is the outer surface of the third twisted wire layer 123. Specifically, the second twisted wire layer 122 includes twenty-four of the Twinax cables C, each of which is the Twinax cable 30 having a cross-sectional structure illustrated in FIG. 3A. The configuration of the Twinax cable C is indicated in column (C) of Table 1. The inner conductor of the signal wire included in the Twinax cable C meets the AWG 44 standard. That is, the Twinax cable C is a cable with inner conductors having an outer diameter of 0.05023 mm. The Twinax cable C uses a silver-plated copper alloy wire as the inner conductor.

In the second twisted wire layer 122, the Twinax cables C are twisted such that the twist direction is right-handed, and the twist pitch is 70 mm.

The third twisted wire layer 123 includes cables disposed in a region surrounded by the dashed line 123A, which is the outer surface of the third twisted wire layer 123.

The third twisted wire layer 123 includes the main twisted wire layer 1231 and the sub twisted wire layer 1232 from the center CE side.

The sub twisted wire layer 1232 includes the Twinax cables C and first insulated cables D that are disposed in a region surrounded by the dashed line 123A, which is the outer surface of the third twisted wire layer 123, and the dashed line 1231A, which is the outer surface of the main twisted wire layer 1231. Specifically, the sub twisted wire layer 1232 includes 11 of the Twinax cables C, each of which is the Twinax cable 30 having a cross-sectional structure illustrated in FIG. 3A, and nine of the first insulated cables D, each of which is the first insulated cable 501 having a cross-sectional structure substantially the same as that of the insulated cable 50 illustrated in FIG. 5. The configurations of the Twinax cable C and the first insulated cable D are respectively indicated in columns (C) and (D) of Table 1. The Twinax cable C has already been described. The inner conductor included in the first insulated cable D meets the AWG34 standard. That is, the first insulated cable D is a cable with the inner conductor having an outer diameter of 0.1601 mm. The first insulated cable D uses a tin-plated soft copper wire as the inner conductor. The first insulated cable D is a single wire.

In the sub twisted wire layer 1232, the Twinax cables C and the first insulated cables D described above are twisted together such that the twist direction is right-handed, and the twist pitch is 53 mm.

The main twisted wire layer 1231 includes second insulated cables E disposed in a region surrounded by the dashed line 1231A, which is the outer surface of the main twisted wire layer 1231. Specifically, the main twisted wire layer 1231 includes eight of the second insulated cables E, each of which is the second insulated cable 502 having a cross-sectional structure substantially the same as that of the insulated cable 50 illustrated in FIG. 5. The configuration of the second insulated cable E is indicated in column (E) of Table 1. The inner conductor included in the second insulated cable E meets the AWG 30 standard. That is, the second insulated cable E is a cable with the inner conductor having an outer diameter of 0.2546 mm. The second insulated cable E uses a tin-plated soft copper wire as the inner conductor. The second insulated cable E is a single wire.

In the main twisted wire layer 1231, the second insulated cables E described above are twisted together such that the twist direction is right-handed, and the twist pitch is 40 mm.

Here, the thickness T1231 of the main twisted wire layer and the thickness T1232 of the sub twisted wire layer were measured at any 10 positions in the same cross section, and the thickness T1231 of the main twisted wire layer was thicker than the thickness T1232 of the sub twisted wire layer at all the measurement positions.

Then, the shield layer 11 and the outer sheath 13 are disposed on the outer periphery of the twisted wire portion 12. Silver plated copper alloy wire is used as the shield layer 11, and a polyvinyl chloride resin (PVC) is used as the outer sheath 13. The outer diameter of the multicore cable 150 is 6.5 mm.

With respect to the obtained multicore cable, the flex resistance test, the torsion characteristic test, and the roller test described above were performed. The evaluation results were all "passed", and the multicore cable of Experimental Example 1 passed the tests as a whole.

Experimental Example 2

Figure 13:
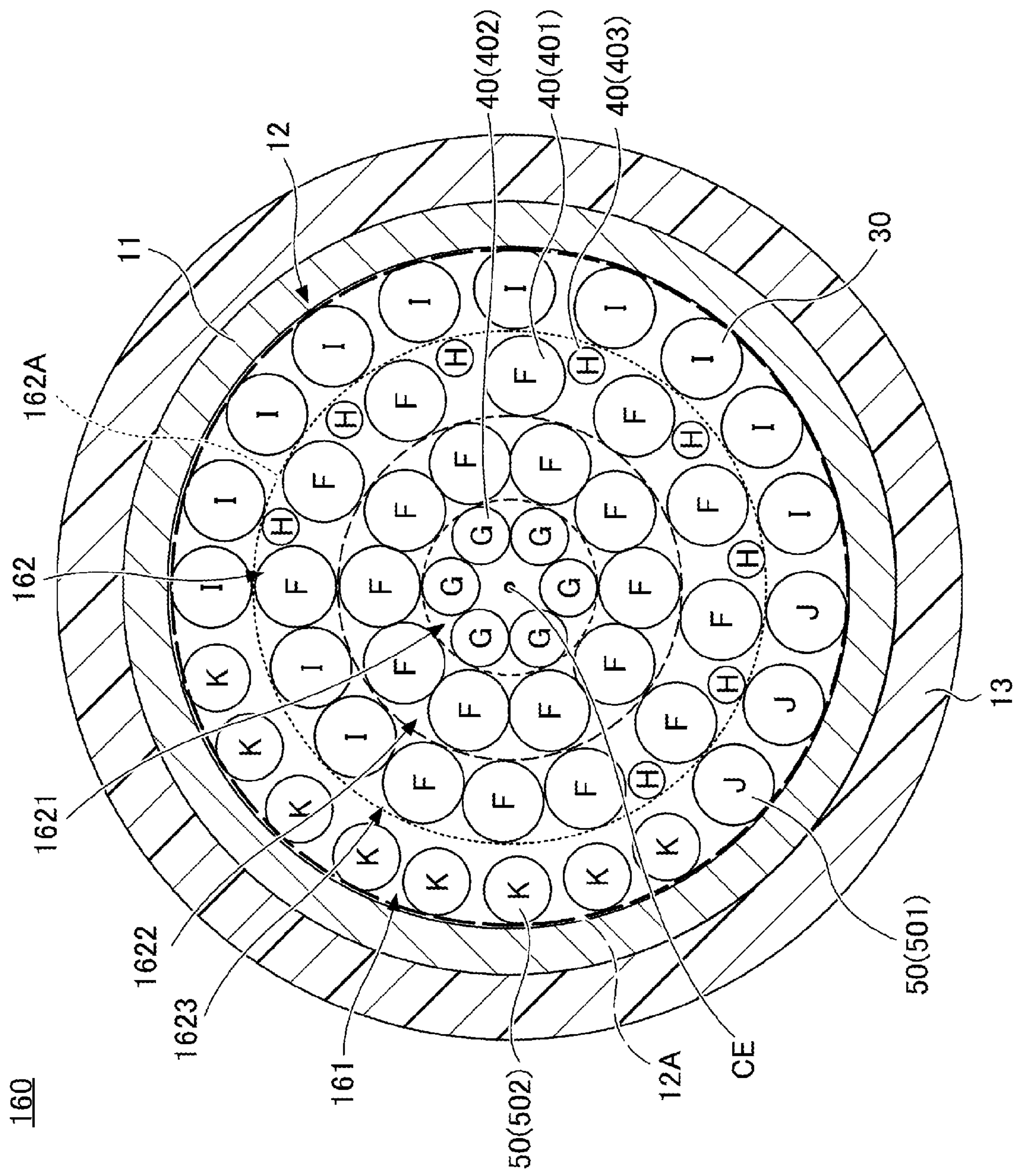
FIG. 13 is an explanatory diagram of a structure of a multicore cable produced in Experimental Example 2.

A multicore cable 160 having a structure illustrated in FIG. 13 in a cross section perpendicular to the longitudinal direction by the following procedure.

The twisted wire portion 12 of the multicore cable 160 includes a first twisted wire layer 161 and a second twisted wire layer 162.

The first twisted wire layer 161 includes cables disposed in a region surrounded by the outer surface 12A of the twisted wire portion 12 and a dotted line 162A, which is an outer surface of the second twisted wire layer 162.

Specifically, the first twisted wire layer 161 includes 10 Twinax cables I, three sets of insulated cable units J, and eight insulated cables K. That is, in Experimental Example 2, the Twinax cable is disposed in the first twisted wire layer 161, which is different from Experimental Example 1.

Here, the Twinax cable I is the Twinax cable 30 having a cross-sectional structure illustrated in FIG. 3A. The insulated cable unit J is a unit of the first insulated cable 501 having a cross-sectional structure substantially the same as that of the insulated cable 50 illustrated in FIG. 5. The insulated cable K is a single wire of the second insulated cable 502 having a cross-sectional structure substantially the same as that of the insulated cable 50 illustrated in FIG. 5.

The configurations of the Twinax cable I, the insulated cable unit J, and the insulated cable K are indicated in columns (I) to (K) of Table 2.

The inner conductor of the signal wire included in the Twinax cable I meets the AWG 44 standard. That is, the Twinax cable I is a cable with the inner conductor having an outer diameter of 0.05023 mm. The Twinax cable I uses silver-plated copper alloy wire as the inner conductor.

The inner conductor included in the first insulated cable 501 of the insulated cable unit J meets the AWG 34 standard. That is, the first insulated cable 501 is a cable with the inner conductor having an outer diameter of 0.1601 mm. The first insulated cable 501 uses a tin-plated soft copper wire as the inner conductor. In the insulated cable unit J, three of the first insulated cables 501 are twisted together such that the twist direction is right-handed, and the twist pitch is 30 mm.

The inner conductor included in the insulated cable K meets the AWG 30 standard. That is, the insulated cable K is a cable with the inner conductor having an outer diameter of 0.2546 mm. The insulated cable K uses a tin-plated soft copper wire as the inner conductor.

In the first twisted wire layer 121, the Twinax cable I, the insulated cable unit J, and the insulated cable K described above are twisted together such that the twist direction is right-handed, and the twist pitch is 120 mm.

The second twisted wire layer 162 includes cables disposed within a region surrounded by the dotted line 162A, which is the outer surface of the second twisted wire layer 162.

The second twisted wire layer 162 includes a main twisted wire layer 1621, a first sub twisted wire layer 1622, and a second sub twisted wire layer 1623, from the center CE side.

The second sub twisted wire layer 1623 includes 11 sets of the first coaxial cable units F, each of which is a unit of the first coaxial cables 401, eight of the coaxial cables H, each of which is the third coaxial cable 403, and two of the Twinax cables I, each of which is the Twinax cable 30. The configurations of the first coaxial cable unit F, the coaxial cable H, and the Twinax cable I are indicated in columns (F), (H), and (I) of Table 2. Both the first coaxial cable 401 and the third coaxial cable 403 have a cross-sectional structure substantially the same as the coaxial cable 40 illustrated in FIG. 4.

As indicated in Table 2, the first coaxial cable unit F is a unit in which eight of the first coaxial cables 401 are twisted together such that the twist direction is right-handed. The first coaxial cable 401 is a cable with the inner conductor that meets the AWG 46 standard, that is, the first coaxial cable 401 is a cable with the inner conductor having an outer diameter of 0.03984 mm. The first coaxial cable 401 uses a silver-plated copper alloy wire as the inner conductor, and uses a tin-plated copper alloy wire as the shield conductor. The twist pitch of the first coaxial cable unit F is 30 mm.

The inner conductor of the coaxial cable H meets the AWG 42 standard, that is, the coaxial cable H is a cable with the inner conductor having an outer diameter of 0.06334 mm. The coaxial cable H uses a silver-plated copper alloy wire as the inner conductor and a tin-plated copper alloy wire as the shield conductor. The coaxial cable H is a single wire.

The Twinax cable I has already been described.

In the second sub twisted wire layer 1623, the first coaxial cable unit F, the coaxial cable H, and the Twinax cable I described above are twisted together such that the twist direction is right-handed, and the twist pitch is 100 mm.

The first sub twisted wire layer 1622 includes 10 sets of the first coaxial cable units F, each of which is a unit of the first coaxial cables 401. The configuration of the first coaxial cable unit F is indicated in column (F) of Table 2 and has already been described.

In the first sub twisted wire layer 1622, the first coaxial cable units F described above are twisted together such that the twist direction is right-handed, and the twist pitch is 75 mm.

The main twisted wire layer 1621 includes six sets of the second coaxial cable units G, each of which is a unit of the second coaxial cables 402. The configuration of the second coaxial cable unit G is indicated in column (G) of Table 2. The second coaxial cable 402 has a cross-sectional structure substantially the same as the coaxial cable 40 illustrated in FIG. 4.

As indicated in Table 2, the second coaxial cable unit G is a unit in which four of the second coaxial cables 402 are twisted together such that the twist direction is right-handed. The second coaxial cable 402 is a cable with the inner conductor that meets the AWG 46 standard, that is, the second coaxial cable 402 is a cable with the inner conductor having an outer diameter of 0.03984 mm. The second coaxial cable 402 uses a silver-plated copper alloy wire as the inner conductor and a tin-plated copper alloy wire as the shield conductor. Additionally, the twist pitch of the second coaxial cable unit G is 20 mm.

In the main twisted wire layer 1621, the second coaxial cable units G described above are twisted such that the twist direction is right-handed, and the twist pitch is 50 mm.

Then, the shield layer 11 and the outer sheath 13 are disposed on the outer periphery of the twisted wire portion 12. A silver plated copper alloy wire is used as the shield layer 11, and a polyvinyl chloride resin (PVC) is used as the outer sheath 13. The outer diameter of the multicore cable 160 is 6.5 mm.

With respect to the obtained multicore cable, the flex resistance test, the torsion characteristic test, and the roller test described above were performed. The torsion characteristic test and the roller test were all passed. However, in the flex resistance test, the Twinax cable I broke and failed the test, and the multicore cable of Experimental Example 2 failed the tests as a whole.

TABLE 1

| | (A) | (B) | (C) | (D) | (E) |
|---|---|---|---|---|---|
| CONFIGURATION | AWG46 COAXIAL CORE | AWG42 COAXIAL CORE | AWG44 TWINAX | AWG34 INSULATED WIRE | AWG30 INSULATED WIRE |

TABLE 1-continued

| | | | (A) | (B) | (C) | (D) | (E) |
|---|---|---|---|---|---|---|---|
| | | | 16 CABLES CORE UNIT | 8 CABLES CORE UNIT | | | |
| TWIST IN UNIT | | PITCH | 40 mm | 30 mm | | | |
| | | DIRECTION | RIGHT | RIGHT | | | |
| THIRD TWISTED WIRE LAYER | MAIN TWISTED WIRE LAYER | PITCH | | | | | 40 mm |
| | | DIRECTION | | | | | RIGHT |
| | SUB TWISTED WIRE LAYER | PITCH | | | | 53 mm | |
| | | DIRECTION | | | | RIGHT | |
| SECOND TWISTED WIRE LAYER | | PITCH | | | 70 mm | | |
| | | DIRECTION | | | RIGHT | | |
| FIRST TWISTED WIRE LAYER | | PITCH | 100 mm | | | | |
| | | DIRECTION | RIGHT | | | | |

TABLE 2

| | | | (F) | (G) | (H) | (I) | (J) | (K) |
|---|---|---|---|---|---|---|---|---|
| CONFIGURATION | | | AWG46 COAXIAL CORE 8 CABLES CORE UNIT | AWG46 COAXIAL CORE 4 CABLES CORE UNIT | AWG42 COAXIAL CORE | AWG44 TWINAX | AWG34 INSULATED WIRE 3 CABLES CORE UNIT | AWG30 INSULATED WIRE |
| TWIST IN UNIT | | PITCH | 30 mm | 20 mm | | | 30 mm | |
| | | DIRECTION | RIGHT | RIGHT | | | RIGHT | |
| SECOND TWISTED WIRE LAYER | MAIN TWISTED WIRE LAYER | PITCH | | 50 mm | | | | |
| | | DIRECTION | | RIGHT | | | | |
| | FIRST SUB TWISTED WIRE LAYER | PITCH | 75 mm | | | | | |
| | | DIRECTION | RIGHT | | | | | |
| | SECOND SUB TWISTED WIRE LAYER | PITCH | 100 mm | | 100 mm | | | |
| | | DIRECTION | RIGHT | | RIGHT | | | |
| FIRST TWISTED WIRE LAYER | | PITCH | | | | | 120 mm | |
| | | DIRECTION | | | | | RIGHT | |

As is apparent from the results of Experimental Example 1 and Experimental Example 2, it is confirmed that the Twinax cables closest to the shield layer among multiple Twinax cables included in the twisted wire portion are arranged in the second twisted wire layer, so that the multicore cable having better flex resistance can be obtained.

What is claimed is:

1. A multicore cable comprising:

a twisted wire portion including a plurality of Twinax cables and a plurality of coaxial cables, and a shield layer disposed on an outer periphery of the twisted wire portion, wherein the twisted wire portion includes a first twisted wire layer and a second twisted wire layer in a cross section perpendicular to a longitudinal direction of the multicore cable, the first twisted wire layer being closest to the shield layer, and the second twisted wire layer being located on a center side from the first twisted wire layer and being adjacent to the first twisted wire layer, and wherein a closest Twinax cable is disposed in the second twisted wire layer, the closest Twinax cable being closest to the shield layer among the plurality of Twinax cables included in the twisted wire portion.

2. The multicore cable claimed in claim 1, wherein a twist pitch in the first twisted wire layer is greater than a twist pitch in the second twisted wire layer.

3. The multicore cable claimed in claim 1, wherein the first twisted wire layer includes one or more coaxial cables only, among the plurality of coaxial cables.

4. The multicore cable claimed in claim 1, wherein the second twisted wire layer includes one or more Twinax cables only, among the plurality of Twinax cables.

5. The multicore cable claimed in claim 1, wherein the twisted wire portion includes an insulated cable.

6. The multicore cable claimed in claim 5, wherein the twisted wire portion includes a third twisted wire layer, wherein the third twisted wire layer is located on the center side from the second twisted wire layer and disposed adjacent to the second twisted wire layer in the cross section perpendicular to the longitudinal direction of the multicore cable, and wherein the third twisted wire layer includes the insulated cable and a Twinax cable among the plurality of Twinax cables.

7. The multicore cable claimed in claim 6, wherein the third twisted wire layer includes, from a center in the cross section perpendicular to the longitudinal direction of the multicore cable to outward in the cross section, a main twisted wire layer and a sub twisted wire layer, a twist pitch in the sub twisted wire layer being greater than a twist pitch in the main twisted wire layer, and wherein a thickness of the main twisted wire layer is thicker than a thickness of the sub twisted wire layer.

* * * * *